US006934955B2

(12) United States Patent
Nickum

(10) Patent No.: US 6,934,955 B2
(45) Date of Patent: Aug. 23, 2005

(54) EVENT NOTIFICATION WITHIN A LOCAL SYSTEM

(75) Inventor: Larry A. Nickum, Sioux City, IA (US)

(73) Assignee: Gateway Inc., Irvine, CA (US)

(*) Notice: Subject to any disclaimer, the term of this patent is extended or adjusted under 35 U.S.C. 154(b) by 0 days.

(21) Appl. No.: 09/218,916

(22) Filed: Dec. 22, 1998

(65) Prior Publication Data

US 2002/0147524 A1 Oct. 10, 2002

(51) Int. Cl.[7] .......... G06F 13/00; G05B 9/02

(52) U.S. Cl. .......... 719/318; 700/80; 705/8; 718/100

(58) Field of Search .......... 700/9, 80; 340/506, 340/825.44, 7.3, 7.2, 7.24, 7.25; 455/31.1; 704/273, 274; 370/338; 709/202, 227, 228, 229, 318, 100; 705/9; 719/318

(56) References Cited

U.S. PATENT DOCUMENTS

| | | | | | |
|---|---|---|---|---|---|
| 4,856,047 | A | | 8/1989 | Saunders | 342/372 |
| 5,043,721 | A | | 8/1991 | May | 340/825.44 |
| 5,151,929 | A | | 9/1992 | Wolf | 379/57 |
| 5,166,973 | A | | 11/1992 | Hoff | 465/31.2 |
| 5,402,466 | A | | 3/1995 | Delahanty | 379/44 |
| 5,459,458 | A | | 10/1995 | Richardson et al. | 340/825.52 |
| 5,479,408 | A | | 12/1995 | Will | 370/313 |
| 5,561,703 | A | * | 10/1996 | Arledge et al. | 455/31.2 |
| 5,623,242 | A | | 4/1997 | Dawson, Jr. et al. | 340/311.1 |
| 5,805,886 | A | * | 9/1998 | Skarbo et al. | 709/318 |
| 5,822,583 | A | * | 10/1998 | Tabuchi | 709/100 |
| 6,038,542 | A | * | 3/2000 | Ruckdashel | 705/9 |
| 6,144,942 | A | * | 11/2000 | Ruckdashel | 705/9 |
| 6,160,477 | A | * | 12/2000 | Sandelman et al. | 340/506 |
| 6,209,011 | B1 | * | 3/2001 | Vong et al. | 708/112 |

* cited by examiner

*Primary Examiner*—Leo Picard
*Assistant Examiner*—Sheela S. Rao
(74) *Attorney, Agent, or Firm*—Ross F Hunt, Jr.; Stites and Harbison PLLC

(57) ABSTRACT

An event notification system is described. The system comprises a computer having a CPU and memory and which executes an operating system operative to manage computer programs and wherein the programs generate events, a notification controller connected to the computer and operative to detect the generated events, a notification transceiver communicatively connected to the notification controller and capable of transmitting a message containing data on the event, and a portable transceiver including a notifier for receiving the message.

27 Claims, 3 Drawing Sheets

EVENT NOTIFICATION WITHIN A LOCAL SYSTEM

FIELD OF THE INVENTION

The present invention relates generally to event notification and specifically to event notification integrated within a local system.

BACKGROUND OF THE INVENTION

It is often the case, in both home and office environments, that a computer user wishes to be notified immediately when a particular event takes place. Examples of such events comprise reception of faxes, incoming phone calls, incoming e-mail (electronic mail) messages, completion of tasks by a computer system, and detection of unauthorized access to a computer system. In addition, many computer systems now have the additional capability of receiving telephone voice mail messages. However, the user must be near enough to the computer to be able to view the monitor or to hear an audible indication in order to be notified of the occurrence of the desired event. Often the user, while they may be present in the home or office building, cannot, or does not wish to remain near the computer in order to personally monitor the system for the occurrence of the desired event.

Previous attempts to provide a solution to the problem have generally followed one of two approaches. The first approach employs a conventional paging system and is similar to the invention described in U.S. Pat. No. 5,623,242 to Dawson. In this approach, the user wears a conventional pager, which is capable of receiving transmissions from a paging service provider. Upon the occurrence of a detectable event, the detecting system uses conventional dialing techniques to dial the paging service provider and input a message indicating that the detected event has occurred. The paging service provider then transmits the message to the pager using radio signals.

This approach presents several disadvantages. First, in addition to the costs of the hardware and software associated with the system, the user must typically pay a monthly charge to a paging service provider. Second, the reliability of the system is dependent on several external factors beyond the user's control or knowledge. The system must have access to a phone line and the phone line must be available for use by the paging system. Also, there must be an available (i.e. non-busy) phone line into the paging service provider's system. Additionally, the paging service provider's system must be operating properly. A breakdown in any one of these external systems can result in the failure to notify the user of an event. Finally, there can be unacceptable delays in transmitting the message to the user if the phone lines are busy, or if the paging service provider's system introduces delays in message transmission.

A second approach utilizes a central system that receives messages which are then transmitted to a pager. This approach is described in U.S. Pat. No. 5,479,408 to Will. In this approach, a central computer system receives messages from a variety of client systems. The central system then uses a radio transmitter to transmit a message on behalf of the client system to a conventional pager worn by a user. By incorporating the radio transmission means into the central server, this approach avoids the expense and uncertainties introduced through the use of a paging service provider. However, it shares some of the same disadvantages with the first approach. If the central system is inoperable, it is impossible to transmit messages representing event notifications on behalf of any of the client systems desiring to use the central server. In addition, the central system can become a bottleneck if there are a large number of client systems needing to send event notification messages, thereby introducing undesirable delays in transmitting the event notifications.

Therefore, what is needed is an integrated event notification system capable of notifying a user within a home or office building of events detected by a computer. The system should not require the use of a paging service provider. In addition, the system should be capable of notifying a user of a number of different types of events, including notification of incoming fax, e-mail or phone messages, the completion of tasks or processes by the computer, or unauthorized access to the computer. The system should be capable of transmitting notification of these events in as short a time as possible following the occurrence of an event. Finally, the system should be dependent on as few external systems as possible.

SUMMARY OF THE INVENTION

The above-mentioned shortcomings, disadvantages and problems are addressed by the present invention, which will be understood by reading and studying the following specification. The invention describes an event notification system that notifies a user of significant events detected by a computer. In one embodiment of the invention, an event notification system includes a computer having a CPU and memory and which executes an operating system having computer programs representing applications and interfaces and wherein the applications and interfaces generate events. A notification controller connected to the computer and operates to detect the generated events, and a notification transceiver communicatively connected to the notification controller transmits a message containing data related to the event. The system further includes a portable transceiver including a notifier for receiving said message.

In one embodiment incoming faxes, e-mail messages and telephone calls generate events. In addition, system related events such as security breaches and completion of long running tasks are also generated. These events are detected by the notification controller, which then causes the transceiver to transmit a message intended for reception by a small portable transceiver. The portable transceiver contains mechanisms operative to alert a user to the computer generated event. These mechanisms include, but are not limited to lighting LEDs, displaying a message on an LCD panel, vibrating the portable transceiver, giving an audible beep, or giving an audible synthesized or pre-recorded voice message.

Still other and further aspects, advantages and embodiments of the present invention will become apparent by reference to the drawings and by reading the following detailed description.

DETAILED DESCRIPTION OF THE INVENTION

In the following detailed description of the embodiments, reference is made to the accompanying drawings which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

Figure 1A:
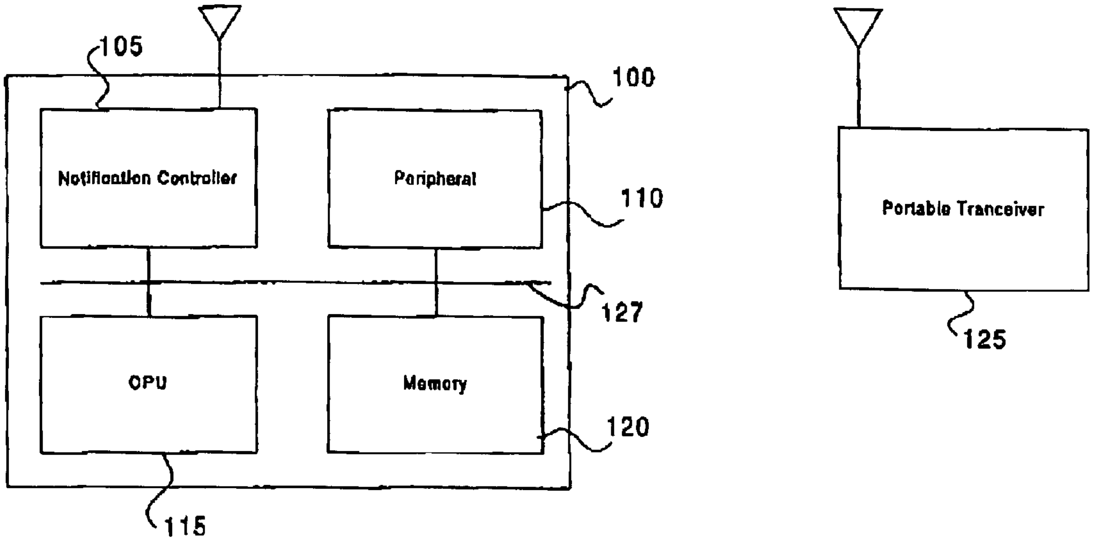
FIGS. 1A and 1B are block diagrams showing the major physical components of embodiments of the invention.

Referring first to FIG. 1A, a simplified block diagram of the major physical components of an embodiment of an event notification system is shown. Computer 100 provides a base platform for the event notification system. Computer 100 comprises CPU 115, memory 120, peripherals 110 and event notification controller 105, all communicatively interconnected via bus 127.

CPU 115 comprises at least one central processing unit and is capable of executing computer program instructions that form the operating system, applications and interfaces executed by the computer system.

Memory 120 comprises a variety of persistent and non-persistent memory devices conventionally used in computer systems, including but not limited to Read-Only Memory (ROM), Random Access Memory (RAM), Flash-ROM, hard drives, floppy drives, cartridge drives, CD-ROM drives, DVD-ROM drives and other similar devices capable of storing executable program instructions and data.

Peripherals 110 comprise a variety of different devices, including but not limited to keyboards, pointer devices, monitors, audio output devices, tape backup units and other similar devices. Also included are communications devices comprising network interfaces, serial and parallel interfaces, modems, telephone interfaces and other telecommunications devices.

Notification controller 105 comprises an electronic device having circuitry and logic enabling the device to respond to particular interrupts generated by the various components of computer 100. In one embodiment of the invention, notification controller 105 also contains a transmitter capable of transmitting a signal intended to be received by a remote user in possession of a portable transceiver 125. Typically a low power transmitter is used and signal reception is therefore limited to a local area such as a house, office building, or a campus. Also, the transmitter component of notification controller 105 typically transmits a signal at one of the frequencies licensed by the Federal Communications Commission (FCC) for local use. In an alternative embodiment, notification controller 105 is capable of both transmitting and receiving a signal, which enables the notification controller to transmit a message and receive an acknowledgment that the message was received by the appropriate portable transceiver 125.

Portable transceiver 125 is a small receiver capable of receiving signals transmitted by notification controller 105 and comprises circuitry and logic to receive and identify messages contained in the signals. In addition, portable transceiver 125 includes means to notify a user that a message has been received. In one embodiment of the invention, the means used is an LED that is lit to indicate that an event has occurred. In an alternative embodiment, multiple LEDs are used, with a specific combination of lit LEDs used to indicate a specific event. In a further embodiment, portable transceiver 125 vibrates to indicate an event has been detected. In a still further embodiment, portable transceiver 125 contains an LCD panel capable of displaying characters comprising a message indicating the event. In yet another embodiment, a speech synthesizer enunciates a message indicating that an event has occurred. The audio source data can comprise a set of predefined messages that are stored locally on the portable transceiver, such as "you have a voice mail message", "you have a fax", "you have an e-mail" etc. Alternatively, the audio source can be transmitted as part of the message sent from the notification controller to the portable receiver 125 thereby providing for the potential of a wider variety of audio messages. Those skilled in the art will recognize that other options exist for alerting the user to an event, and that those described above could also be used in combination with one another to provide multiple means for the portable transceiver to notify the user that an event has occurred.

Desirably, portable transceiver 125 is small allowing it to be easily carried by a user. In one embodiment, portable transceiver 125 is enclosed in a housing the size of a conventional pager. In alternative embodiments, portable transceiver 125 is incorporated into objects typically carried by a user, such as rings, watches, pens and the like. In an alternative embodiment, portable transceiver 125 also includes circuitry and logic allowing it to transmit a response to a message, for example an acknowledgment that a message indicating an event was received.

Figure 1B:
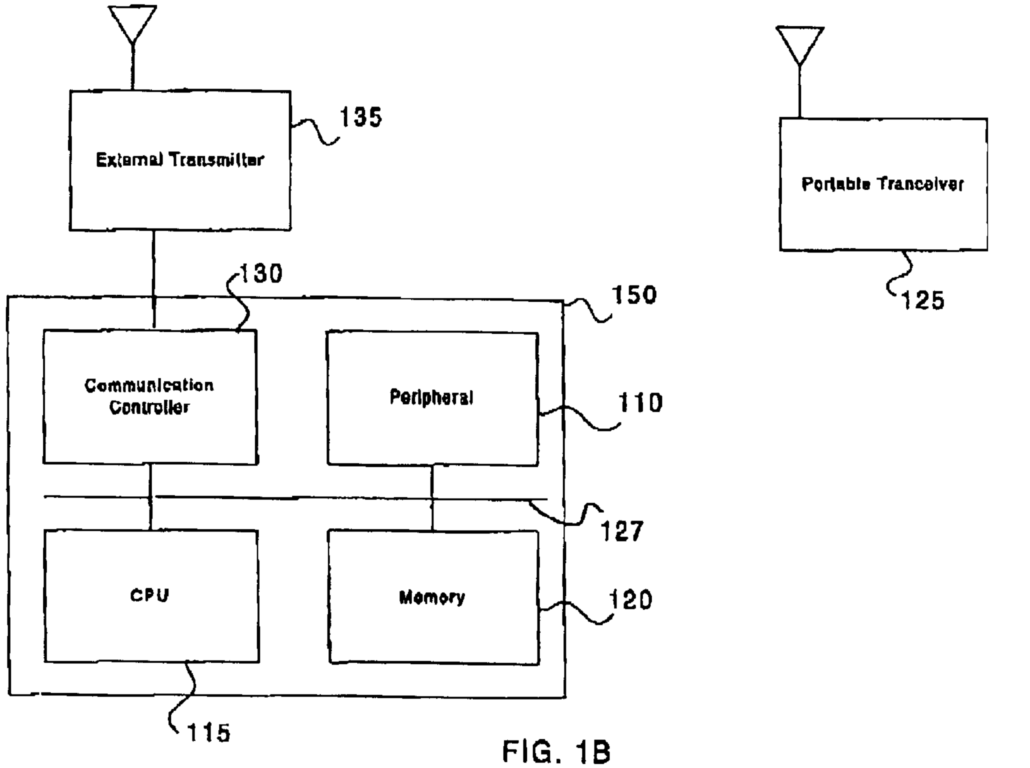

Referring now to FIG. 1B, the major physical components of an alternative embodiment of the invention are shown. Like the embodiment shown with reference to FIG. 1A, event notification computer 150 comprises CPU 115, Memory 120 and Peripherals 110 all connected via bus 125. However, in this embodiment, some of the functionality provided by notification controller 105 is separated into two components, communication controller 130 and external transceiver 135.

Communication controller 130 is a device connected to bus 125 and includes controllers supporting conventional communications protocols for controlling input and output via serial ports, parallel ports, Universal Serial Bus (USB) ports, infra-red (IR) ports and similar communications ports. Communication controller 130 is communicatively connected to external transceiver 135 using means appropriate to the specific type of port that the transceiver is connected to.

External transceiver 135 is a transmitter capable of transmission of a signal intended to be received by portable transceiver 125. External transceiver transmits signals in response to commands received via communication controller 130. Like the signals transmitted by notification controller 105, the signals transmitted by external transceiver 135 are low power and are of a frequency licensed for local communication by the FCC.

Figure 2:
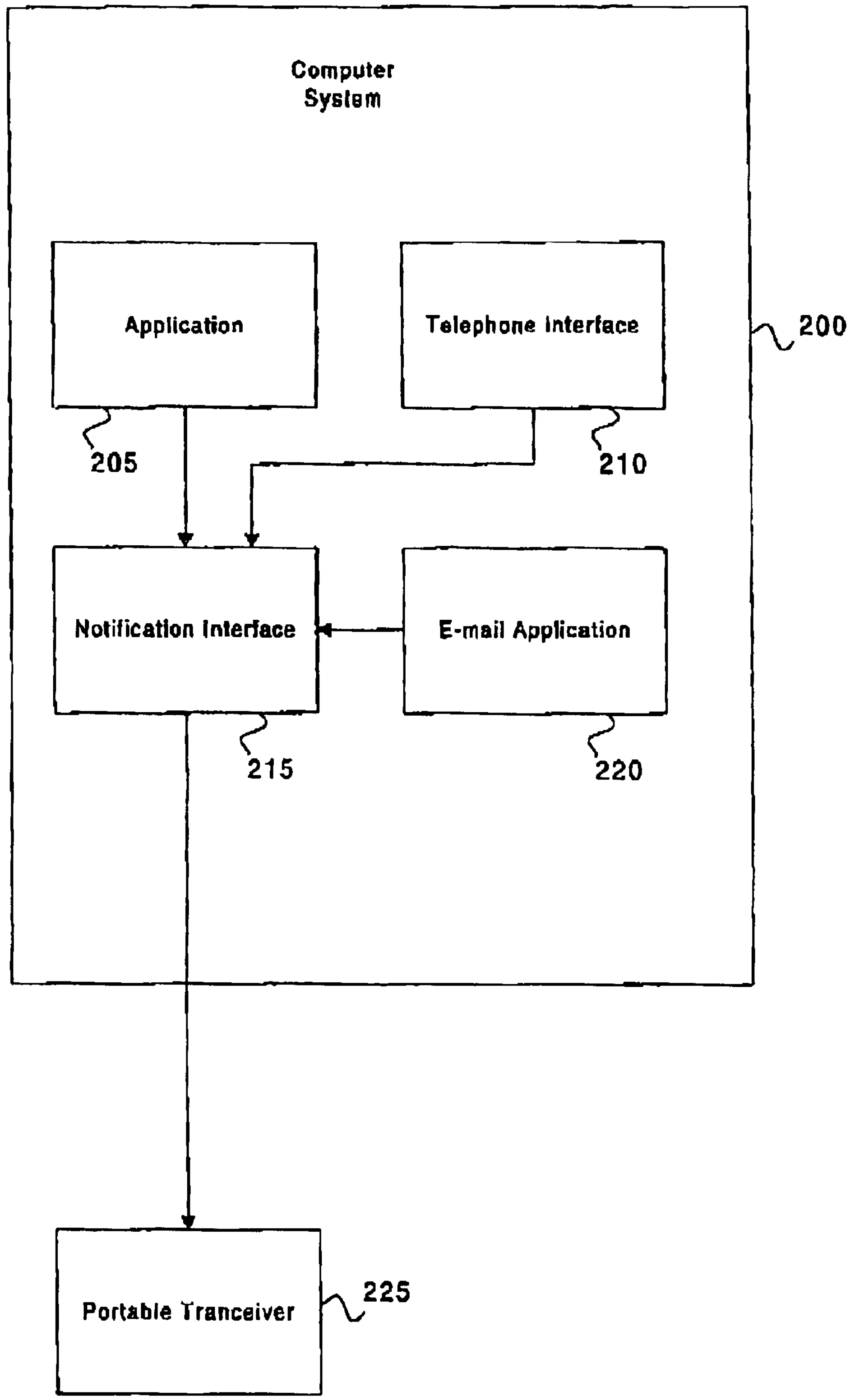
FIG. 2 is a block diagram showing the major functional components of an embodiment of the invention.

Referring now to FIG. 2, a simplified block diagram of an event notification system is shown, with each block representing a functional component of the present invention. Computer system 200 comprises a conventional operating system capable of running a variety of applications 205, an e-mail system 220, an optional telephone interface 210, and a notification interface 215.

Application 205 represents a variety of differing computer programs, including word processors, compilers, compressors, encryptors, spreadsheet calculators, presentation designers and computer security maintainers. These applications vary in the degree to which they require user intervention and the length of time needed to process to completion. For example, compilers, compressors and encryptors can take several hours to process, while word processors, spreadsheet calculators and presentation designers are more interactive and typically take less time to respond to user requests.

Telephone interface 210 comprises computer programs and routines that provide interfaces to a number of different telephony devices, include data communications modems, facsimile (fax), voice messaging, and voice communications devices. These devices may communicate in either a wireless environment, such as a cellular phone environment, or in a conventional wired environment. Separate devices may or may not be required to support the functionality indicated above. For example one device may handle both fax and data communications, and a separate device may handle voice communications and voice messages.

E-mail 220 is a computer program comprising a conventional electronic mail application. These systems facilitate the exchange of electronic messages between computer systems and users. Examples include, but are not limited to Microsoft Outlook, Exchange, GroupWise, and CCMail.

Notification interface 215 provides an interface within computer system 200 allowing various components such as application 205, telephone interface 210 and e-mail system 220 to notify a user about a significant event related to the component. The events described below are included to provide examples of the types of events that may be significant to a user, and are not meant to limit the application to any particular event. For example, an application completion event may be generated when application 205 is a long running application that the user desires to know has completed without having to constantly monitor the computer's screen. An incoming fax event is generated when a fax is received via telephone interface 210. An incoming voice call event is generated when a voice call is received via telephone interface 210. An incoming voice message event is generated when a voice mail message is received via telephone interface 210. In incoming e-mail message event is generated when an e-mail is received by e-mail component 220 of computer system 200.

In one embodiment of the invention, notification interface 215 is a device driver that detects and responds to events generated by the components described above. In this embodiment, the occurrence of an event is communicated to the notification interface using operating system and hardware specific device communication features. Typically the feature used is the interrupt request, or IRQ. The notification controller 105 (FIG. 1A) is assigned one or more specific, configurable interrupt request numbers to distinguish the controller from other devices in the computer. An interrupt request using one of the interrupt identifiers assigned to the notification controller causes the notification interface software to process the interrupt, using the method detailed below.

Figure 3:
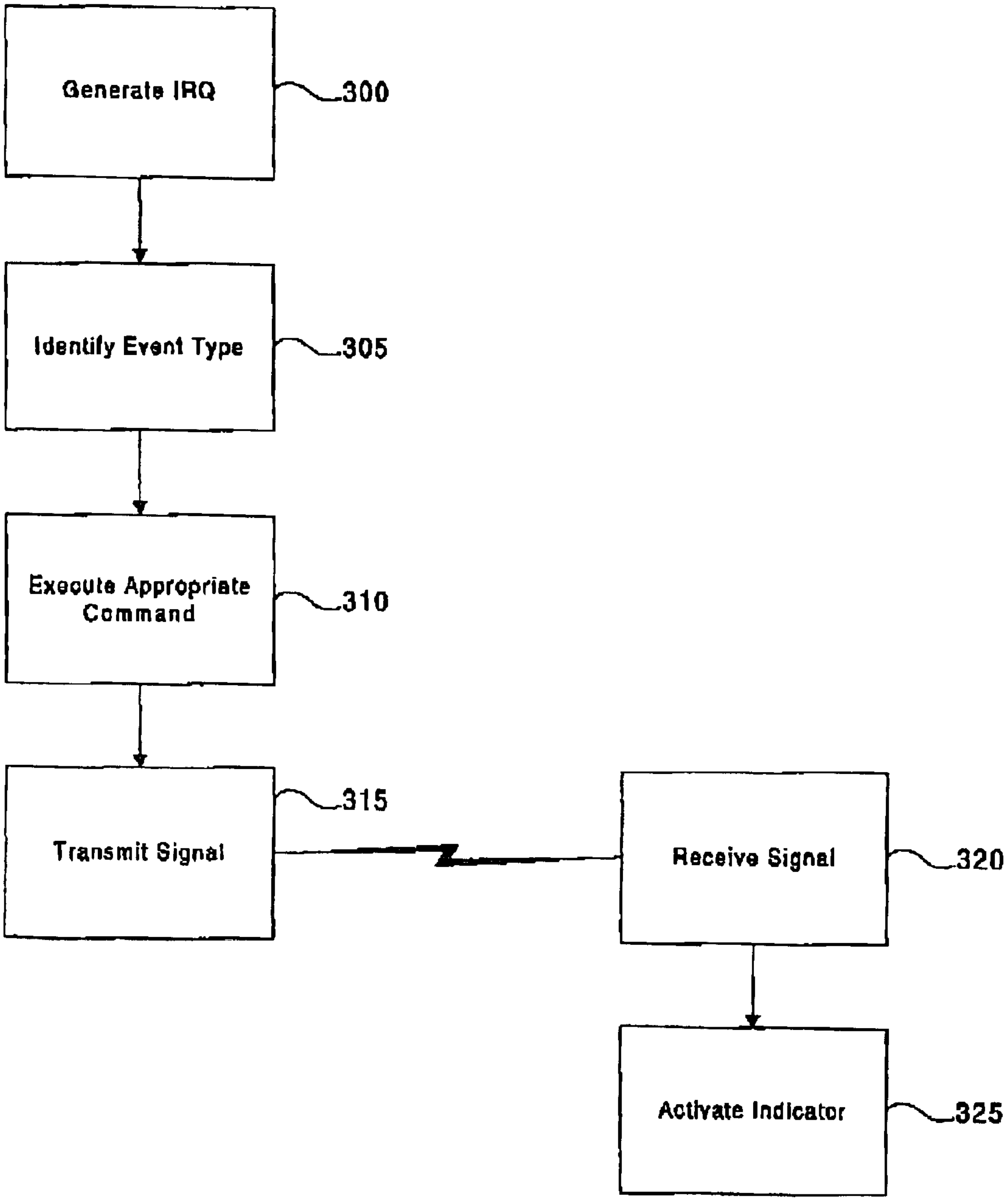
FIG. 3 is a flow diagram showing the sequence of events during the operation of an embodiment of the invention.

Referring now to FIG. 3, a flow diagram is shown, detailing the tasks executed when an event occurs. The event may be generated by software or by the occurrence of a hardware related event. Examples of software events include, but are not limited to the arrival of e-mail, the completion of a long-running computer program or the detection of a breach in the computer system's security or other unauthorized use. Examples of hardware related events would be the detection of an incoming phone call, fax message or voice mail message.

The process begins at 300, where the component detecting the event use an IRQ to indicate to the notification controller 105 or communication controller 130 that an event has occurred. In one embodiment of the invention, distinct IRQs are used to indicate particular events. For example, in this embodiment one IRQ is dedicated to indicate e-mail arrival, another IRQ indicates the arrival of a FAX and yet another IRQ indicates a miscellaneous event. In an alternative embodiment, one IRQ is used to indicate an event and additional data is associated with the IRQ to indicate which of the specific events listed above occurred.

Next, at 305, programmable logic in notification controller 105 or communication controller 130 (collectively referred to as "controller"), in response to the IRQ, determines the event that occurred through the specific IRQ and/or the data associated with the IRQ and identifies the type of event causing the interrupt. Desirably a look-up table of different events is used to determine the specific type of event indicated by the IRQ or event data and the commands to be executed in response to the event.

At 310, the controller executes commands appropriate for the particular type of event indicated in the data associated with the interrupt request. For example, in one embodiment of the invention, if the event data indicates that an e-mail message has arrived, the controller starts a process that retrieves data indicating the sender, the subject, or the content of the e-mail message. This data can then be imbedded in the message to be transmitted to the portable transceiver.

Next, at 315, the controller causes the transmitter to transmit a signal containing the command and associated data determined from 310 above. The signal is received by portable transceiver 125. Portable transceiver 125 contains programmable logic, which at 320 decodes the command and associated data contained in the signal.

Based on the command and data obtained in 320, 325 activates an appropriate indicator. In one embodiment of the invention, the activation process lights one or more LEDs, with the combination of LEDs indicating the event type. In an alternative embodiment of the invention, the activation process causes the portable transceiver 125 to vibrate. In another embodiment of the invention, the activation process emits an audible tone. In yet another embodiment, the activation process displays a message on an LCD panel, with the message indicating the type of event that occurred, and in the case of an e-mail message, displaying text further describing the message. This text comprises the sender, subject, or e-mail message text. In a further embodiment, and audible message is produced. The source for the message is either a pre-recorded or speech synthesized message associated with an event.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, the logical functionality of the notification controller can be divided into components, some of which execute on the notification controller and others of which are executed by the computer in which the controller resides. Therefore, it is manifestly intended that this invention be limited only by the following claims and equivalents thereof.

I claim:

1. An event notification system, comprising:

a computer having a CPU and memory and which executes an operating system operative to manage computer programs and wherein said computer programs generate events, the computer further having a bus coupled to the CPU;

a notification controller connected to the bus and operative to detect the generated events:

a wireless notification transceiver communicatively connected to the notification controller and capable of transmitting a signal including a message containing data on the event; and a portable transceiver including a notifier for receiving said message.

2. The system of claim 1 wherein the notifier is an LED.

3. The system of claim 1 wherein the notifier is an LCD panel operative to display a text based message.

4. The system of claim 1 wherein the notifier is a speech-synthesizer capable of producing an audible voice message.

5. The system of claim 1 wherein the notifier is a speaker operative to produce an audible indication that the message has been received.

6. The system of claim 1 wherein the notification transceiver is integrated with the notification controller.

7. The event notification system of claim 1 wherein the notification transceiver is further capable of receiving an acknowledgment to the message from the portable transceiver.

8. The system of claim 1 wherein the event is one of a computer application completion event, an incoming fax event, an incoming voice call event, an incoming e-mail event, detection of a security system breach and detection of unauthorized use of the computer.

9. An event notification system, comprising:

a computer having a CPU and memory and which executes an operating system operative to manage computer programs and wherein said computer programs generate events, the computer further having a bus coupled to the CPU;

a notification controller connected to the bus and operative to detect the generated events; and a wireless notification transceiver notification transceiver communicatively connected to the notification controller and capable of transmitting a signal including a message containing data on the event to activate a portable transceiver.

10. The event notification system of claim 9 wherein the notification transceiver is integral to the notification controller.

11. The event notification system of claim 9 wherein the notification transceiver operates al, at a frequency licensed for local use.

12. The event notification system of claim 9 wherein the notification transceiver is operable to receive an acknowledgment of the transmitted message.

13. The system of claim 9 wherein the event is one of a computer application completion event, an incoming fax event, an incoming voice call event, an incoming e-mail event, detection of a security system breach and detection of unauthorized use of the computer.

14. A method for notifying a remote user of an event occurring on a computer, the method comprising:

generating an event from a software program;

detecting the event;

signaling a notification controller coupled to a bus and a wireless transceiver that the event has been detected; and using the wireless transceiver, transmitting a signal including a message containing data about the event to a portable transceiver.

15. The method of claim 14 wherein the software program comprises an e-mail application.

16. The method of claim 14 wherein the software program comprises a fax interface program.

17. The method of claim 14 wherein generating an event comprises generating an interrupt request (IRQ) and detecting the event comprises responding to the interrupt.

18. The method of claim 14 further comprising activating a notifier on the portable transceiver to alert a user to the message.

19. The method of claim 14 further comprising receiving an acknowledgment of the message.

20. The method of claim 14 wherein the event is one of a computer application completion event, an incoming fax event, an incoming voice call event, an incoming e-mail event, detection of a security system breach and detection of unauthorized use of the computer.

21. A computer-readable medium having computer-executable instructions for performing the steps of:

generating an event from a software program run on a computer;

detecting the event;

signaling a notification controller coupled to a bus and a wireless transceiver that the event has been detected; and transmitting a signal including a message containing data about the event to a portable transceiver.

22. The computer-readable medium of claim 21 wherein the software program comprises an e-mail application.

23. The computer-readable medium of claim 21 wherein the software program comprises a fax interface program.

24. The computer-readable medium of claim 21 wherein generating an event comprises generating an interrupt request (IRQ) and detecting the event comprises responding to the interrupt.

25. The computer-readable medium of claim 21 further comprising activating a notifier on the portable transceiver to alert a user to the message.

26. The computer-readable medium of claim 21 further comprising receiving an acknowledgment of the message.

27. The computer-readable medium of claim 21 wherein the event is one of a computer application completion event, an incoming fax event, an incoming voice call event, an incoming e-mail event, detection of a security system breach and detection of unauthorized use of the computer.

* * * * *